United States Patent [19]

Hinman

[11] Patent Number: 4,752,366

[45] Date of Patent: Jun. 21, 1988

[54] PARTIALLY CONDUCTIVE CATHODE FOR ELECTROCHEMICAL MACHINING

[75] Inventor: Edmund R. Hinman, Monroe, Conn.

[73] Assignee: Ex-Cell-O Corporation, Troy, Mich.

[21] Appl. No.: 797,069

[22] Filed: Nov. 12, 1985

[51] Int. Cl.⁴ .................................................. B23H 9/10
[52] U.S. Cl. ............................... 204/224 M; 204/290 R
[58] Field of Search ............ 204/224 M, 224 R, 280, 204/290 R, 297 R, 284

[56] References Cited

U.S. PATENT DOCUMENTS

| | | | |
|---|---|---|---|
| 2,650,979 | 9/1953 | Teubner | 204/224 M X |
| 2,739,935 | 3/1956 | Kehl et al. | 204/224 M |
| 3,214,361 | 10/1965 | Williams | 204/224 M |
| 3,268,434 | 8/1966 | Weingartner | 204/224 M |
| 3,276,988 | 10/1966 | Williams | 204/284 |
| 3,288,699 | 11/1966 | Trager et al. | 204/224 M X |
| 3,326,785 | 6/1967 | Williams | 204/140.5 |
| 3,332,863 | 7/1967 | Woods | 204/224 M X |
| 3,372,099 | 3/1968 | Clifford | 204/224 M |
| 3,410,781 | 11/1968 | Carlson et al. | 204/224 M |
| 3,429,798 | 2/1969 | Beck et al. | 204/206 |
| 3,445,372 | 5/1969 | Fromson | 204/224 M X |
| 3,467,593 | 9/1969 | Dickson et al. | 204/290 R X |
| 3,476,674 | 11/1969 | Mikoshiba et al. | 204/224 M |
| 3,499,830 | 3/1970 | Haggerty et al. | 204/224 M |
| 3,530,271 | 9/1970 | Ullmann et al. | 204/290 R X |
| 3,566,068 | 2/1971 | Bruner et al. | 219/68 |
| 3,714,017 | 1/1973 | Stark et al. | 204/224 M X |
| 3,723,268 | 3/1973 | Johns et al. | 204/129.55 X |
| 3,803,009 | 4/1974 | Kawafune et al. | 204/129.1 |
| 3,849,273 | 11/1974 | Johnson | 204/129.5 X |
| 3,970,538 | 7/1976 | Lucas | 204/224 M |
| 4,013,526 | 3/1977 | Inoue | 204/224 M X |
| 4,052,284 | 10/1977 | Schrader | 204/224 M |
| 4,057,475 | 11/1977 | Schrader | 204/129.1 |
| 4,100,388 | 7/1978 | Meyer | 219/69 M |
| 4,256,555 | 3/1981 | Wilson et al. | 204/129.5 |
| 4,532,019 | 7/1985 | Kuromatsu | 204/224 M X |

*Primary Examiner*—Donald R. Valentine
*Attorney, Agent, or Firm*—Edward J. Timmer

[57] ABSTRACT

The cathode includes a machining surface, at least a portion of which comprises alternate layers or lamina of conductive and non-conductive material whose spacing and thickness are selected to reduce over-cutting on the workpart surface.

4 Claims, 2 Drawing Sheets

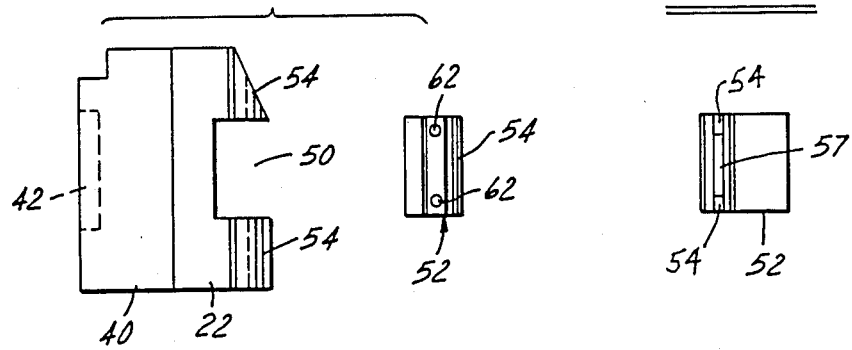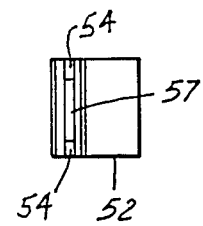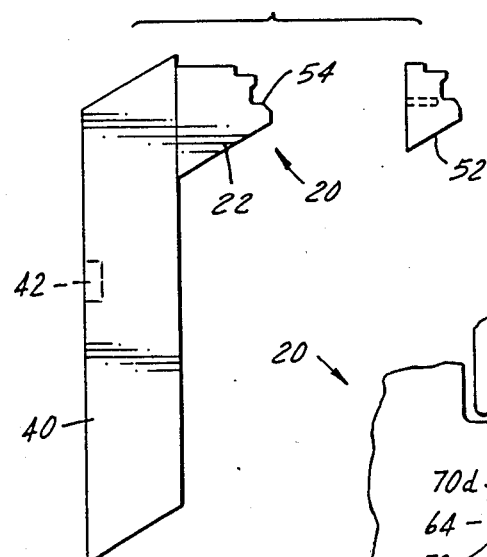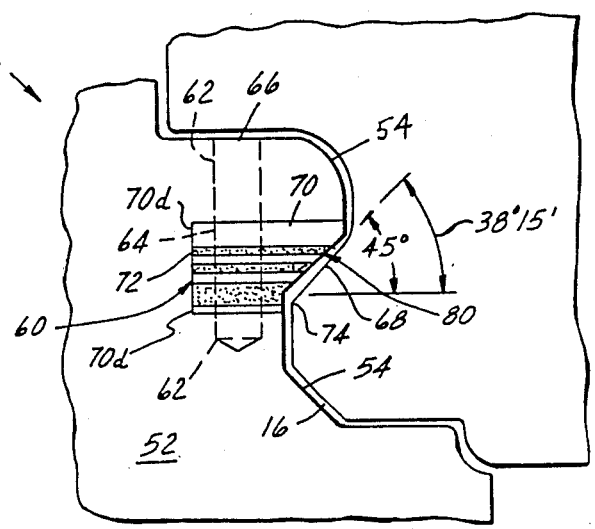

PARTIALLY CONDUCTIVE CATHODE FOR ELECTROCHEMICAL MACHINING

FIELD OF THE INVENTION

The present invention relates to electrochemical machining and, in particular to a cathode construction for use in such machining to reduce overcutting of close tolerance workparts.

BACKGROUND OF THE INVENTION

Electrochemical machining (ECM) has been used in the past to machine close tolerance surfaces on gas turbine engine parts, such as the airfoils and roots of blades and vanes. A problem experienced in ECM'ing such parts has been over-cutting or excessive removal of material from certain areas on the work-parts. In particular, it has been difficult to maintain tolerances for the 45° pressure angle and adjacent radii on the root form of certain compressor blades as a result of over-cutting during the ECM process. There is a need to reduce over-cutting in this application so that required tolerances can be maintained on a consistent basis.

Cathode structures for ECM'ing the leading and trailing edge radii of an airfoil are disclosed in U.S. Pat. Nos. 3,849,273 and 3,970,538.

Cathodes and ECM processes for forming airfoil members are also disclosed in U.S. Pat. Nos. 3,714,017; 3,803,009; 4,052,284; 4,057,475; and 4,256,555.

Composite cathode structures for ECM'ing gears, spiral lands and other workparts are illustrated in U.S. Pat. Nos. 3,268,434; 3,429,798; and 3,499,830.

Other patents involving ECM processes and cathodes include U.S. Pat. Nos. 2,650,979; 3,288,699; 3,326,785; 3,410,781; 3,566,068 and 4,100,388.

SUMMARY OF THE INVENTION

The invention contemplates a cathode for an ECM process wherein at least a portion of a machining surface of the cathode comprised alternate layers of lamina of conductive and non-conductive material adjacent the workpart surface being machined with the thickness and spacing of the layers selected to reduce over-cutting of the workpart surface. Also contemplated is such a laminated cathode machining surface which has an inclination or angular orientation different from that of the workpart surface to be machined to reduce overcut.

BRIEF DESCRIPTION OF THE DRAWINGS

FIG. 2 is an end elevation of one of the cathodes shown in FIG. 1 with the insert detached.

FIG. 3 is a plan view of the cathode of FIG. 2.

FIG. 4 is a side elevation of the detached insert of FIG. 3.

FIG. 5 is an enlarged partial end elevation of the cathode adjacent a root form machined.

BEST MODE FOR CARRYING OUT THE INVENTION

Figure 1:
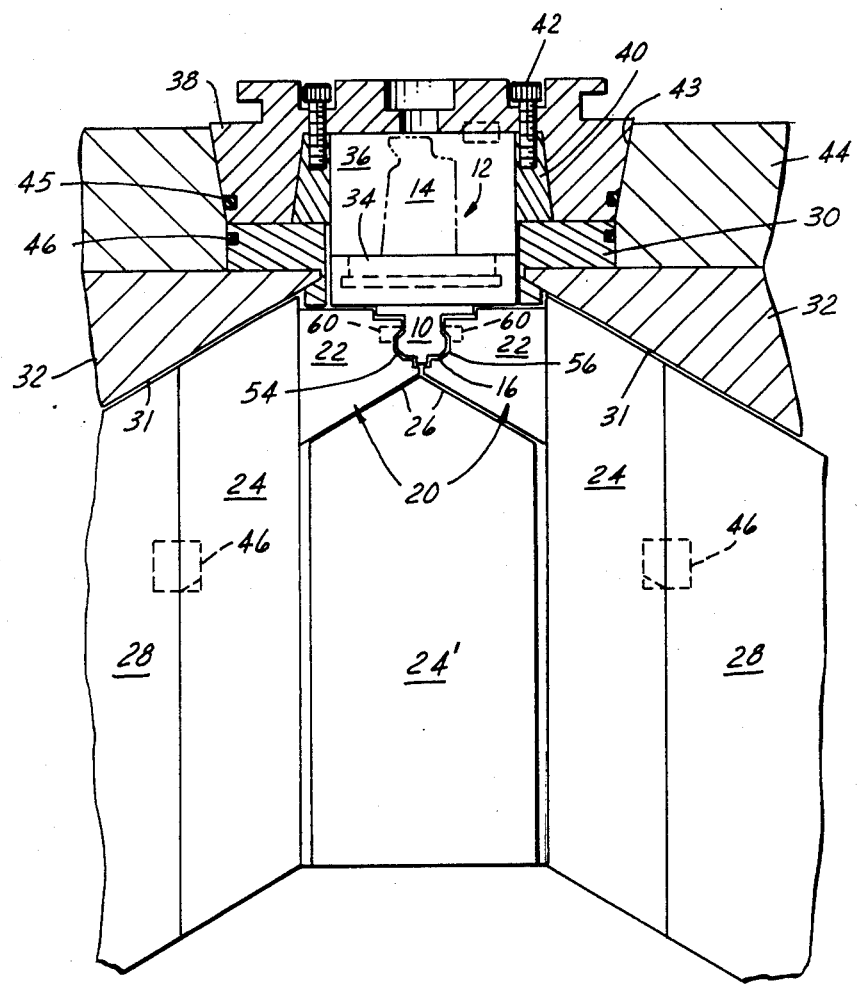
FIG. 1 is an end elevation of an ECM apparatus for machining the root form of a compressor blade of a gas turbine engine.

FIG. 1 illustrates an electrochemical machining apparatus for machining the root form 10 of a gas turbine engine compressor blade 12 having an airfoil 14 attached to the root form. An electrolyte chamber 16 is formed between the cathode 20 and the root form. In particular, each cathode includes a working cathode member 22 on opposite sides of the root form as shown and spaced therefrom. The cathodes are shown in FIG. 1 in the fully advanced position at the end of machining the root form. Below the root form is a seal member 24 having surfaces 26 across which the cathode members slide and seal as the cathodes are advanced toward the root form during machining. Above the root form is a seal plate or cover 30 through which the root form extends as shown for machining. Each cathode member 22 is affixed to a cathode holder 24 which, itself, is affixed to a ram member 28 driven by a conventional ball screw assembly. At the top, the cathode holders 24 and ram members 28 are guided in movement by inclined surfaces 31 on plae members 32 of the machine.

The compressor blade is fixtured with the root form between the cathodes as shown by a fixture plate 34 disposed in the seal plate 30. The airfoil 14 is located in chamber 36 formed by chamber-forming members 38, 40 held together by multiple machine screws 42. Members 38, 40 in turn, are located in an opening 43 in a machine top plate 44 with seals 45,46 providing electrolyte seals to prevent leakage.

As is known, electrolyte, such as an aqueous salt solution, is caused to flow through the electrolyte chamber between the root form surfaces to be machined and the respective opposed facing cathode members 22. A source of electrolyte and pump (not shown) provide such electrolyte and form no part of the invention. Likewise, means known to the art are provided to make the root form anodic relative to the cathodes so that metal is removed electrolytically therefrom when current is flowed through the electrolytic cell formed by the root form, cathodes and electrolyte.

FIGS. 2-5 illustrate the cathode structure of the invention in detail. In particular, each cathode 20 includes the holder 24 having an elongate shank 40 with keyway 42. The shank 40, as mentioned, is affixed to the ram member 28 by machine screws (not shown) with the keyway 42 receiving a key 46 (FIG. 1) to insure proper alignment.

The working cathode member 22 may be a separate component affixed to the holder shank 40 by suitable fastening means such as machine screws or it may be integral with the holder shank. Each cathode member 22 includes a generally central slot 50 adapted to receive a primary cathode insert 52. As is apparent, e.g. see FIGS. 1, 4 and 5, the profile of the working surfaces 54, of each cathode working member 22 and insert 52 is configured generally similar to the profile of the root form although not identical as will become apparent.

The primary cathode insert 52 includes a recessed pocket 57 adapted to receive a secondary composite laminated cathode insert 60 as shown best in FIG. 5. The primary insert 52 includes a pair of spaced counterbores 62 which align coaxially with cylindrical holes 64 in the secondary insert 60 for rceiving pins 66 for fixedly and accurately holding the secondary insert 60 in the pocket 57, FIG. 5.

Figure 6:
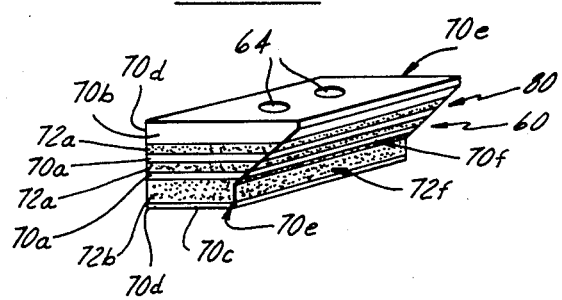
FIG. 6 is a perspective view of the composite laminated cathode insert used to reduce over-cutting.

The secondary cathode insert 60 is located relative to the root form so as to machine the 45° pressure surface 68 thereof which is a high tolerance surface required for fixturing in a support disc or hub as is well known. The pressure surface 68 may have a straight, conical or other surface profile. As shown, the secondary insert 60 is of composite construction comprising alternate conductive layers or laminations 70 and non-conductive layers or laminations 72. For illustrative purposes only, the conductive layers 70 are brass whereas the non-conductive layers 72 are plastic, such as nylon 101 available from E. I. DuPont de Nemours & Co., Wilmington, Del. Importantly, the thickness and/or spacing between the conductive and non-conductive layers 70, 72 is selected to reduce observed excessive over-cutting on the convex radius 74 on the root form and the 45° pressure surface 68. For the root form shown in FIG. 5 and insert 60 shown in FIG. 6, the four intermediate, alternating brass and plastic layers 70a, 72a have a thickness which is equal and one-third the thickness of the top brass layer 70b and bottom plastic layer 72b, which are of equal thickness. The bottom brass layer 70c is equal in thickness to the intermediate, alternating brass and plastic layers. The brass layers 70 carry electrical current by virtue of physical contact with the primary insert 52, which is made of copper, at their inner edges 70d and end edges 70e and also at the respective top and bottom surfaces of the top brass layer 70b and bottom brass layer 70c.

Another important feature of the secondary insert 60 is the angle of inclination of working surface 80 thereon. In particular, the angle of inclination is selected so as to be less than the 45° inclination of pressure surface 68. The spacing between surfaces 68 and 80 increases as one proceeds from right to left (relative to FIG. 5) along the pressure surface 68 or along the center line of the root form. For illustration only, an angle of 38°15′ has been found suitable for the working surface 80.

The laminations of the secondary insert 60 are typically initially held together in stacked relation by an epoxy cement therebetween. The working surfaces 54 of the primary inserts 52 and the outer edges 70f, 72f adjacent the root form and constituting the working surfaces 80 of the secondary inserts 60 are machined to desired profile when assembled on the working cathode members 22.

The semi or partially conductive nature of the secondary insert 60 provided by the alternating conductive and non-conductive layers 70, 72 with the reduced angle of inclination of the working surface 80 has enabled electrochemical machining of the root form while maintaining high tolerancs required for the 45° pressure surface 68 and radii adjacent the pressure surface.

Although certain preferred features and embodiments of the invention have been described hereinabove and in the drawings, it is to be understood that modifications and changes may be made therein without departing from the spirit and scope of the invention as defined in the appended claims.

I claim:

1. A cathode for electrochemically machining a side of a root form attached to a gas turbine engine airfoil with said side of the root form having a high tolerance pressure angle surface to be machined intermediate and interconnecting adjacent root form surfaces to be machined, comprising a cathode working surface with a general root form profile for machining said side of the root form with said cathode working surface having a partially conductive pressure angle working surface portion by virtue of having exposed multiple conductive layers and nonconductive layers in alternating sequence for positioning in spaced opposing machining relation to said pressure angle surface to be machined and having conductive root form working surface portions adjacent the partially conductive pressure angle working surface portion for positioning in spaced opposing machining relation to respective said adjacent root form surfaces to be machined with said conductive layers and conductive root form working surface portions being electrically connected, said partially conductive pressure angleworking surface portion having an angle of inclination less than that of the pressure angle surface to be machined to provide a space for electrolyte therebetween that increases in dimension along the length of space toward the cathode, whereby said adjacent root form surfaces and said pressure angle surface can be machined by the cathode working surface with reduced over-cutting of the pressure angle surface.

2. The cathode of claim 1 wherein said multiple conductive layers and non-conductive layers in alternating sequence have edges with said edges of said layers forming the partially-conductive pressure angle working surface portion.

3. The cathode of claim 2 wherein said multiple conductive layers and non-conductive layers are in the form of a partially conductive laminated insert received din a recessed pocket in the cathode working surface facing the pressure angle surface.

4. The cathode of claim 1 wherein the conductive layers and conductive root form working surface portions are electrically connected to one another by virtue of being in contact with a common conductive cathode body.

* * * * *

UNITED STATES PATENT AND TRADEMARK OFFICE
CERTIFICATE OF CORRECTION

PATENT NO. : 4,752,366

DATED : June 21, 1988

INVENTOR(S) : Edmund R. Hinman

It is certified that error appears in the above-identified patent and that said Letters Patent is hereby corrected as shown below:

```
Column 1, line 17, change "work-parts" to --workparts.
Column 1, line 40, change "comprised" to --comprises--.
Column 1, line 40, change "of" (second occurrence) to
--or--.  Column 1, line 54, change "an end elevation" to
--a plan view--.  Column 1, line 56 change "a plan view"
to --an elevation--.  Column 1, line 57 change "a
side" to --an end--, after "of the" insert --cathode and--
.  Column 1, line 58, change "3" to --2--.  Column 2, line
2, change "cathode" to --cathodes--.  Column 2, line 7,
change "24" to --24'--.  Column 2, line 17, change "plae"
to --plate--.  Column 2, line 64, after "pressure"
insert --angle--.  Column 2, line 65, after "high"
insert --or close--.  Column 3, line 46, after "high"
insert --or close--.  Column 4, line 7, after "a" delete -
-high tolerance--.  Column 4, line 15, change
"nonconductive" to --non-conductive--.  Column 4, line 43,
change "din" to --in--.
```

Signed and Sealed this

Fifth Day of March, 1991

*Attest:*

HARRY F. MANBECK, JR.

*Attesting Officer*  *Commissioner of Patents and Trademarks*